United States Patent [19]
Jackson et al.

[11] Patent Number: 5,094,265
[45] Date of Patent: Mar. 10, 1992

[54] APPARATUS FOR LOCKING A VALVE ACTUATING MEMBER

[76] Inventors: Lawrence W. A. Jackson, 1120 Rock Street, Victoria, British Columbia, Canada, V8P 2B8; Michael C. Land, Suite 433-3868 Shelbourne Street, Victoria, British Columbia, Canada, V8P 5J1

[21] Appl. No.: 661,136

[22] Filed: Feb. 27, 1991

[51] Int. Cl.[5] .............................................. F16K 35/00
[52] U.S. Cl. .................................... 137/383; 137/382; 251/92
[58] Field of Search ............................ 251/90, 92, 93; 137/382, 383, 385

[56] References Cited

U.S. PATENT DOCUMENTS

| | | |
|---|---|---|
| 664,462 | 12/1900 | Campbell . |
| 1,387,715 | 8/1921 | Hickman ................................. 251/90 |
| 1,554,086 | 9/1925 | Haller ..................................... 251/92 |
| 1,668,223 | 5/1928 | Utman . |
| 1,692,188 | 11/1928 | Roose et al. ........................... 251/93 |
| 1,708,395 | 4/1929 | Muller ................................... 137/382 |
| 2,838,064 | 6/1958 | Schieberl ............................... 137/382 |
| 3,980,099 | 9/1976 | Youngblood ........................... 137/382 |

FOREIGN PATENT DOCUMENTS

| | | |
|---|---|---|
| 425217 | 2/1926 | Fed. Rep. of Germany . |
| 702427 | 2/1941 | Fed. Rep. of Germany . |
| 464898 | 4/1937 | United Kingdom . |
| 471691 | 9/1937 | United Kingdom . |

*Primary Examiner*—A. Michael Chambers
*Attorney, Agent, or Firm*—Bull, Housser & Tupper

[57] ABSTRACT

An apparatus for locking a valve actuating member of a fluid control valve may be used to lock the valve in a closed position. The apparatus is for use with a valve wherein the valve has a valve body and wherein the valve actuating member has a top surface and open and closed positions. The apparatus includes a top portion having a limiting surface for limiting upward movement of the valve actuating member relative to the valve body and gripping means extending from the top portion for gripping the valve body. The gripping means is at a fixed distance from the limiting surface such that the limiting surface is immediately adjacent the top surface of the valve actuating member when the valve actuating member is in the fully closed position and the apparatus is installed.

28 Claims, 2 Drawing Sheets

APPARATUS FOR LOCKING A VALVE ACTUATING MEMBER

BACKGROUND OF THE INVENTION

The invention relates to a valve cover or locking device for preventing access and rotation of a valve actuating member.

In using control valve for controlling the flow of fluid in a fluid conducting line, it is often desirable to provide safety means for ensuring that the valve actuating member is kept in a closed position until fluid flow is required. Such is the case with a conventional propane system wherein it is desired to close a valve on a propane tank to prevent leakage of propane and hence minimize risk of fire.

With conventional propane systems, propane tanks are commonly left in exposed, easily accessible locations such as adjacent a barbeque or trailer, etc. A responsible individual will close the propane tank valve after use of the tank. However with the tank easily accessible, the valve is susceptible to subsequent opening by children, or accidental opening due to inadvertence. Obviously, unplanned opening of the valve can render a barbeque or trailer propane system unsafe due to gas leakage. There is a need for a device to cover the valve actuating member and hence prevent the propane valve from being opened inadvertently. The present invention seeks to address such a problem.

SUMMARY OF THE INVENTION

In accordance with one aspect of the present invention, there is provided an apparatus for locking a valve actuating member of a fluid control valve. The apparatus is for use with a valve wherein the valve has a valve body and wherein the valve actuating member has a top surface and open and closed positions. The apparatus includes a top portion having a limiting surface for limiting upward movement of the valve actuating member relative to the valve body and gripping means extending from the top portion for gripping the valve body. The gripping means is at a fixed distance from the limiting surface such that the limiting surface is immediately adjacent the top surface of the valve actuating member when the valve actuating member is in the fully closed position and the apparatus is installed.

In accordance with another aspect of the present invention there is provided an apparatus for locking a valve actuating member of a fluid control valve having a valve body, the apparatus comprising a cover portion for covering the valve actuating member to prevent access thereto. The cover portion also has connecting means for connecting the cover portion to the valve actuating member. The apparatus further comprises gripping means extending from the cover portion for gripping the valve body to prevent rotation and outward movement of the cover portion relative to the valve body.

In accordance with another aspect of the invention, there is provided a fluid control valve having a valve body and a valve actuating member having a top surface and open and closed positions. There is also provided an apparatus for locking the valve actuating member against movement relative to the valve body, the apparatus comprising a top portion having a limiting surface for limiting upward movement of the valve actuating member relative to the valve body, gripping means extending from the top portion for gripping the valve body, the gripping means being at a fixed distance from the limiting surface such that the limiting surface is immediately adjacent the top surface of the valve actuating member when the valve actuating member is in the fully closed position.

In accordance with another aspect of the invention there is provided an apparatus for locking a valve actuating member of a fluid control valve, the valve actuating member having a top surface and open and closed positions and a valve body with safety relief and outlet ports, the apparatus comprising:

i) a top portion having a limiting surface for limiting upward movement of the valve actuating member relative to the valve body, the top portion having a circular inner wall defining a recess therein for receiving at least a portion of the valve actuating member and connecting means for connecting the top to the valve actuating member, the connecting means including protrusions extending radially from the wall into the recess to engage with complementary portions on the valve actuating member; and ii) gripping means extending from the top portion for gripping the valve body, the gripping means including first and second gripping portions, the first and second gripping portions including first and second parallel spaced apart leg portions extending normal to the top portion and lying in first and second parallel spaced apart planes respectively, the first and second leg portions having first and second C-shaped portions respectively, the first and second C-shaped portions lying in the first and second planes respectively, the first C-shaped portion including first and second resilient arcuate portions extending about a first central axis and the second C-shaped portion including third and fourth arcuate portions extending about a second central axis, the first axis being disposed at a first distance from the limiting surface and the second axis being disposed at a second distance from the limiting surface, the first distance being greater than the second distance, such that the limiting surface is immediately adjacent the top surface of the valve actuating member when the valve actuating member is in the fully closed position, the first and second arcuate portions having a first radius and the third and fourth arcuate portions having a second radius, the first radius being greater than the second radius, the first and second C-shaped portions acting to embrace the safety relief and outlet ports respectively of the valve.

The present invention may be quickly installed on a conventional propane tank valve thus securing the valve and preventing unauthorized movement of the valve actuating member by children. Furthermore, the apparatus is only properly installable on a propane valve when the valve is fully closed which ensures that the valve is closed when the apparatus is installed. Finally, the apparatus may be easily and quickly removed when use of the propane valve is desired. Such removal of the apparatus is too difficult to be done by a child but is easily performed by an adult authorized to use the propane valve.

DETAILED DESCRIPTION

Figure 1:
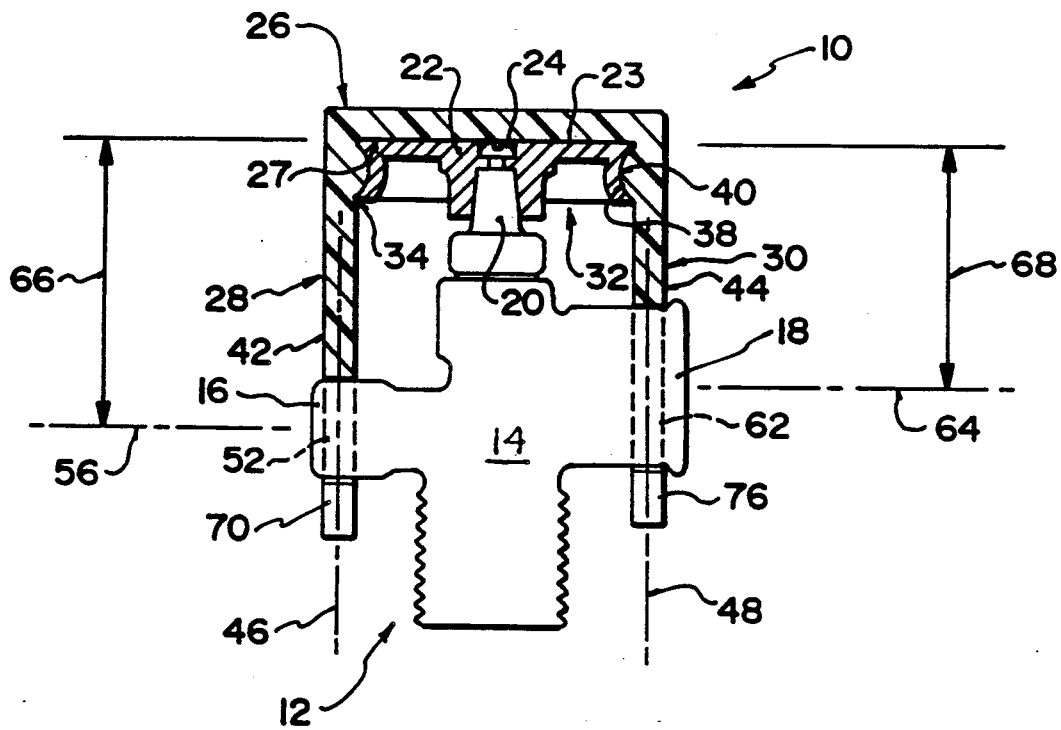
FIG. 1 is a cross-sectional view of an apparatus according to the invention shown installed on a propane valve.

Referring to FIG. 1, an apparatus for locking a valve actuating member of a fluid control valve is shown generally at 10. The apparatus is shown mounted on a conventional propane valve shown generally at 12, the valve having a valve body 14, a safety relief port 16, an outlet port 18, a valve stem 20 extending out of the valve body 14 and a valve actuating member 22 fastened to the valve stem 20 by a screw 24. The valve actuating member 22 has a top surface 23 facing upwards, away from the valve body.

The apparatus 10 includes a circular top portion 26 and first and second gripping portions 28 and 30 extending normal to the top portion 26.

Figure 3:
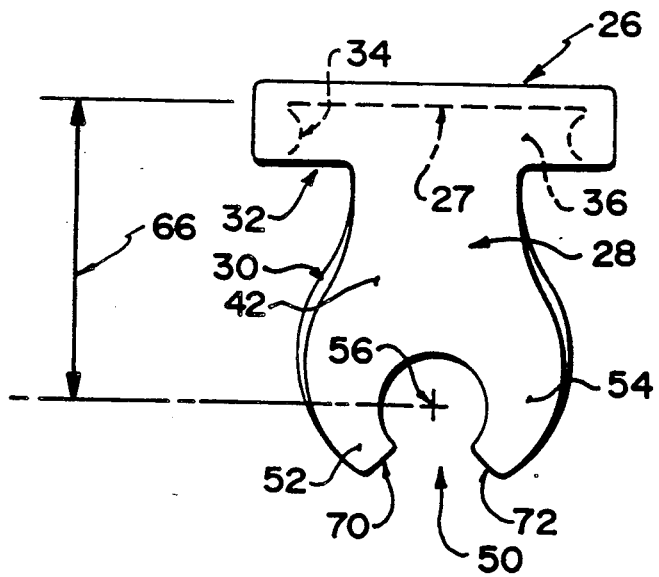
FIG. 3 is a side view of the apparatus.

Referring to FIGS. 1 and 3 the top portion has an underside shown generally at 32, the underside being disposed between the first and second gripping portions 28 and 30. The underside of the top portion 26 has a circular inner wall 34 defining a circular recess 36 within the top portion 26. The recess has a bottom portion defined by an inside limiting surface 27. In the embodiment shown in FIG. 1, the recess completely receives the valve actuating member 22 such that the top surface 23 of the valve actuating member is in contact with the limiting surface 27. The top portion thus covers the valve actuating member and prevents access thereto. Thus the top portion also acts as a cover portion in this embodiment. Clearly, it may be said that the recess receives at least a portion of the valve actuating member.

Figure 2:
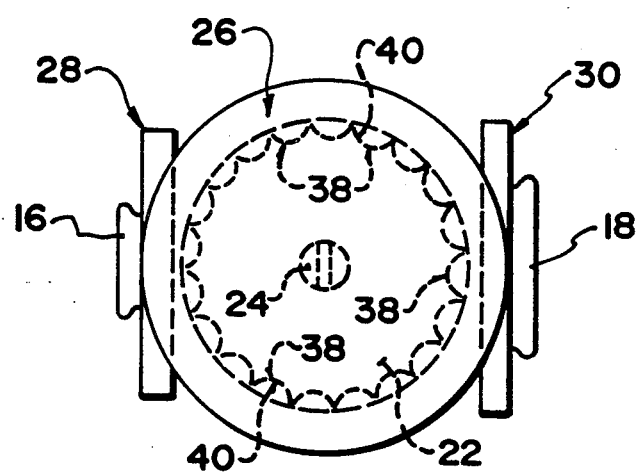
FIG. 2 is a top view of the apparatus shown installed on the propane valve.

The circular inner wall 34 has a plurality of protrusions 38 (also shown in FIG. 2) extending radially from the wall into the recess 36. The protrusions 38 engage with complementary recessed portions 40 in an outside circular perimeter of the conventional valve actuating member 22. The engagement of the plurality of protrusions with complementary portions on the valve actuating member 22 serves to connect the top portion to the valve actuating member and thus the protrusions act as connecting means for connecting the top portion to the valve actuating member.

The first and second gripping portions include first and second parallel spaced apart leg portions 42 and 44 which extend in first and second parallel spaced apart planes 46 and 48.

Referring to FIG. 3, the first leg portion 42 has a C-shaped portion shown generally at 50, the C-shaped portion being formed from first and second arcuate portions 52 and 54 having a first radius of curvature and extending about a first central axis 56.

Figure 4:
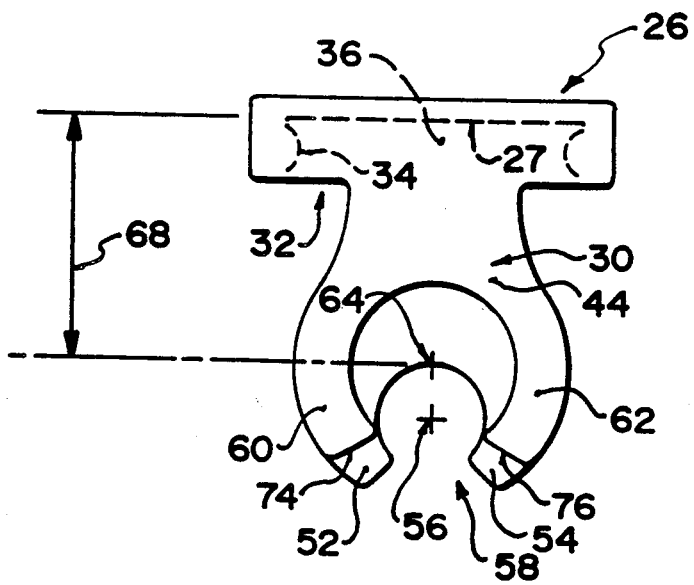
FIG. 4 is a side view of the apparatus taken from an opposite side to that shown in FIG. 3.

Referring to FIG. 4, the second leg portion has a second C-shaped portion 58 formed by third and fourth arcuate portions 60 and 62 having a second radius of curvature and extending about a second central axis 64.

Referring back to FIG. 3, the first central axis 56 is disposed at a first distance 66 from the limiting surface 27. Similarly, referring to FIG. 4, the second central axis 64 is disposed at a second distance 68 from the limiting surface 27.

Referring back to FIG. 1, in this embodiment, the first distance 66 is greater than the second distance 68. In the embodiment shown, the first and second distances 66 and 68 are chosen such that the safety relief port 16 may be embraced by the first C-shaped portion 50 and the outlet port 18 may be embraced by the second C-shaped portion 58.

In addition, in the embodiment shown, the apparatus is for use with a conventional propane tank valve which has safety relief and outlet ports of different diameter. Consequently the first radius of curvature of the first and second arcuate portions is less than the second radius of curvature of the third and fourth arcuate portions.

Referring back to FIGS. 3 and 4, the first and second arcuate portions 52 and 54 terminate in first and second angled portions 70 and 72, the angled portions being spaced apart and operable to deflect the first and second arcuate portions 52 and 54 apart from each other when the angled portions 70 and 72 are pressed onto the safety relief port 16. Similarly, the third and fourth arcuate portions 60 and 62 terminate in third and fourth arcuate portions 74 and 76 which function similarly to the angled portions 70 and 72 to deflect the third and fourth arcuate portions 60 and 62 apart when the third and fourth angled portions 74 and 76 are pressed onto the outlet port 18.

In the embodiment shown, the first and second distances 66 and 68 are chosen such that the safety relief and outlet ports 16 and 18 are properly received within the first and second C-shaped portions 50 and 58 only when the valve actuating member 22 is in a downward, fully closed position wherein flow of fluid through the valve is stopped. That is, the apparatus may only be used on the valve when the valve is fully closed. This provides a safety feature of the apparatus in applications where the apparatus is used to secure a valve on a conventional propane tank.

OPERATION

To use the apparatus 10, the valve actuating member 22 is rotated fully clockwise to close the valve by screwing the valve stem 20 into the valve body. The valve is thus closed and ready to receive the apparatus 10.

The apparatus 10 is aligned over the valve body 14 such that the first leg portion 42 is placed adjacent the safety relief port 16 and the second leg portion 44 is placed adjacent the outlet port 18. The apparatus 10 is then pressed downward onto the valve body 14 such that the safety relief port 16 acts on the first and second angled portions 70 and 72 to spread apart the first and second arcuate portions 52 and 54 and the outlet port 18 acts on the third and fourth angled portions such that the third and fourth angled portions 74 and 76 spread the third and fourth arcuate portions 60 and 62 to receive the safety relief port 16 and the outlet port 18 in the first and second C-shaped portions 50 and 58 respectively. As the apparatus 10 is pressed downward, the valve actuating member 22 is received within the recess 36 and the protrusions 38 engage with the complementary portions 40 on the valve actuating member 22. The surface 27 is thus placed closely adjacent the top surface 23 of the valve actuating member and prevents upward movement of the top surface and hence prevents upward movement of the valve actuating member.

Rotation of the valve member 22 is prevented by the engagement of the protrusions 38 with the complementary portions 40. In addition, outward movement of the valve stem 20 is prevented by interference of the valve actuating member 22 with the limiting surface 27. Lifting the apparatus off the valve is rendered difficult and rotation of the apparatus is impossible due to the first and second leg portions which are firmly secured to the safety relief and outlet ports 16 and 18 by the first and second C-shaped portions 50 and 58. The first and second C-shaped portions thus act as gripping means for gripping the valve body and for preventing rotation of the apparatus.

ALTERNATIVES

It will be appreciated that conventional propane cylinder valves have a safety relief port and an outlet port disposed on opposite sides of the valve stem. The safety relief port and outlet port extend diametrically opposite to each other and radially outwards relative to the valve stem and thus act as projections extending from a fluid control valve.

It will be appreciated, however, that not all valves on which the invention can be used have a safety relief port and an outlet port on opposite sides of the valve body. In fact, the valve may have an inlet port and an outlet port on opposite sides of the body and these may act as projections extending from the valve, which the gripping means may engage.

What is claimed is:

1. An apparatus for locking a valve actuating member of a fluid control valve having a valve body and an axially moveable valve stem connected to the valve actuating member, the valve actuating member having a top surface and open and closed positions, the apparatus comprising:
    (i) a top portion having a limiting surface for limiting axial movement of said valve actuating member relative to said valve body; and
    (ii) gripping means extending from said top portion for gripping said valve body, the gripping means being at a fixed distance from said limiting surface such that said limiting surface is immediately adjacent the top surface of said valve actuating member when said valve actuating member is in the fully closed position.

2. An apparatus as claimed in claim 1 wherein the top portion has connecting means for connecting said top portion to said valve actuating member.

3. An apparatus as claimed in claim 1 wherein said gripping means includes first and second gripping portions for embracing said valve body.

4. An apparatus as claimed in claim 3 wherein said first and second gripping portions embrace projections extending from said fluid control valve.

5. An apparatus as claimed in claim 4 wherein said first and second gripping portions include first and second C-shaped portions centered on first and second axes respectively.

6. An apparatus as claimed in claim 5 wherein said C-shaped portions are resilient.

7. An apparatus as claimed in claim 5 wherein said and second axes are coincident.

8. An apparatus as claimed in claim 5 wherein said first axis is disposed at a first distance from said limiting surface and wherein said second axis is disposed at a second distance from said limiting surface, the first distance being greater than the second distance.

9. An apparatus as claimed in claim 4 wherein said first and second gripping portions include parallel spaced apart leg portions extending normal to said limiting surface.

10. An apparatus as claimed in claim 9 wherein said first and second leg portions having first and second C-shaped portions respectively.

11. An apparatus as claimed in claim 10 wherein said first C-shaped portion includes first and second resilient arcuate portions extending about a first axis and wherein said second C-shaped portion includes third and fourth resilient arcuate portions extending about a second axis.

12. An apparatus as claimed in claim 11 wherein the first and second axes are coincident.

13. An apparatus as claimed in claim 11 wherein the first axis is disposed at a first distance from said limiting surface and wherein said second axis is disposed at a second distance from said limiting surface, said first distance being greater than said second distance.

14. An apparatus as claimed in claim 11 wherein said first and second arcuate portions have a first radius and wherein said third and fourth arcuate portions have a second radius, said first radius being greater than said second radius.

15. An apparatus as claimed in claim 1 wherein said top portion includes a cover portion having a recess therein for receiving at least a portion of said valve actuating member.

16. An apparatus as claimed in claim 15 wherein said cover portion has a circular inner wall defining said recess, said recess including protrusions extending radially from said wall, into said recess to engage with complementary portions on said valve actuating member.

17. In combination:
    (a) a fluid control valve having a valve body, an axially moveable valve stem, and a valve actuating member connected to the valve stem and having a top surface and open and closed positions; and
    (b) an apparatus for locking said valve actuating member against movement relative to said valve body, the apparatus comprising:
        (i) a top portion having a limiting surface for limiting axial movement of said valve actuating member relative to said valve body; and
        (ii) gripping means extending from said top portion for gripping said valve body, the gripping means being at a fixed distance from said limiting surface such that said limiting surface is immediately adjacent the top surface of said valve actuating member when said valve actuating member is in the fully closed position.

18. An apparatus as claimed in claim 20 wherein said top portion has a recess therein for receiving at least a portion of said valve actuating member.

19. An apparatus as claimed in claim 21 wherein said top portion has a circular inner wall defining said recess, and wherein said connecting means includes protrusions extending radially from said wall, into said recess to engage with complementary portions on said valve actuating member.

20. An apparatus as claimed in claim 20 wherein said gripping means includes first and second gripping portions for embracing said valve body.

21. An apparatus as claimed in claim 20 wherein said first and second gripping portions include parallel spaced apart leg portions extending normal to said top portion.

22. An apparatus as claimed in claim 21 wherein said first and second leg portions have first and second C-shaped portions respectively.

23. An apparatus as claimed in claim 25 wherein said first C-shaped portion includes first and second resilient arcuate portions extending about a first axis and wherein said second C-shaped portion includes third and fourth arcuate portions extending about a second axis.

24. An apparatus as claimed in claim 26 wherein the first and second axes are coincident.

25. An apparatus as claimed in claim 26 wherein the first axis is disposed at a first distance from said top portion and wherein said second axis is disposed at a second distance from said top portion, said first distance being greater than said second distance.

26. An apparatus as claimed in claim 26 wherein said first and second arcuate portions have a first radius and wherein said third and fourth arcuate portions have a second radius, said first radius being greater than said second radius.

27. An apparatus for locking a valve actuating member of a fluid control valve, the valve actuating member having a top surface and open and closed positions and the fluid control valve having a valve body and safety relief and outlet ports, the apparatus comprising:
   i) a top portion having a limiting surface for limiting upward movement of said valve actuating member relative to said valve body, the top portion having a circular inner wall defining a recess therein for receiving at least a portion of said valve actuating member and connecting means for connecting said top to said valve actuating member, said connecting means including protrusions extending radially from said wall into said recess to engage with complementary portions on said valve actuating member; and
   ii) gripping means extending from said top portion for gripping said valve body, said gripping means including first and second gripping portions, said first and second gripping portions including first and second parallel spaced apart leg portions extending normal to said top portion and lying in first and second parallel spaced apart planes respectively, said first and second leg portions having first and second C-shaped portions respectively, the first and second C-shaped portions lying in the first and second planes respectively, said first C-shaped portion including first and second resilient arcuate portions extending about a first central axis and said second C-shaped portion including third and fourth arcuate portions extending about a second central axis, the first axis being disposed at a first distance from said limiting surface and said second axis being disposed at a second distance from said limiting surface, said first distance being greater than said second distance, such that said limiting surface is immediately adjacent the top surface of said valve actuating member when said valve actuating member is in the fully closed position, said first and second arcuate portions having a first radius and said third and fourth arcuate portions having a second radius, said first radius being greater than said second radius, the first and second C-shaped portions acting to embrace the safety relief and outlet ports respectively of the valve.

28. An apparatus for locking a valve actuating member of a fluid control valve in which a valve stem moves axially, the valve actuating member having a top surface and open and closed positions and the fluid control valve having a valve body, the apparatus comprising:
   i) a top portion having a limiting surface for limiting upward movement of said valve actuating member relative to said valve body; and
   ii) gripping means extending from said top portion for gripping said valve body, the gripping means including first and second gripping portions for embracing said valve body, said gripping portions including respective first and second C-shaped portions centered on first and second axes respectively the first and second axes being at first and second distances respectively from said limiting surface such that said limiting surface is immediately adjacent the top surface of said valve actuating member when said valve actuating member is in the fully closed position.

* * * * *